US011736024B1

(12) United States Patent
Sigamani et al.

(10) Patent No.: US 11,736,024 B1
(45) Date of Patent: Aug. 22, 2023

(54) CURRENT BALANCING IN COUPLED TRANSFORMERS

(71) Applicant: AES Global Holdings PTE Ltd., Singapore (SG)

(72) Inventors: James Sigamani, Pasig (PH); Rochie Sedillo Libby, Pasig (PH); Jonathan Ross B. Fauni, Quezon (PH)

(73) Assignee: AES Global Holdings PTE Ltd., Singapore (SG)

( * ) Notice: Subject to any disclaimer, the term of this patent is extended or adjusted under 35 U.S.C. 154(b) by 0 days.

(21) Appl. No.: 17/650,721

(22) Filed: Feb. 11, 2022

(51) Int. Cl.
*H02M 3/335* (2006.01)
*H02M 3/00* (2006.01)

(52) U.S. Cl.
CPC ......... *H02M 3/33571* (2021.05); *H02M 3/01* (2021.05)

(58) Field of Classification Search
None
See application file for complete search history.

(56) References Cited

U.S. PATENT DOCUMENTS

| 8,743,575 B2 | 6/2014 | Nymand | |
| 2012/0275197 A1* | 11/2012 | Yan | H02M 3/33573 363/21.02 |
| 2013/0051082 A1* | 2/2013 | Lee | H02M 3/01 363/17 |

OTHER PUBLICATIONS

M. Noah et al., "A Current Sharing Method Utilizing Single Balancing Transformer for a Multiphase LLC Resonant Converter With Integrated Magnetics," in IEEE Journal of Emerging and Selected Topics in Power Electronics, vol. 6, No. 2, pp. 977-992, Jun. 2018.

* cited by examiner

*Primary Examiner* — Jared Fureman
*Assistant Examiner* — Aqeel H Bukhari

(57) ABSTRACT

A power conversion apparatus comprises a main transformer having first and second windings wound about a core and coupled together via mutual inductance. First and second voltage converters are coupled to a first and second input voltage sources and configured to supply first and second currents simultaneously to the first and second windings. The power conversion apparatus also comprises a secondary transformer having a first winding configured to generate a first magnetic flux in a first direction in response to the first current flowing therethrough and having a second winding configured to generate a second magnetic flux in a second direction opposite the first direction in response to the second current flowing therethrough. The first and second windings of the secondary transformer are coupled together via mutual inductance in response to the first and second currents flowing therethrough.

20 Claims, 9 Drawing Sheets

CURRENT BALANCING IN COUPLED TRANSFORMERS

TECHNICAL FIELD

Aspects of the disclosure relate to output power distribution, and more particularly to multi-rail power conversion.

BACKGROUND

A power supply unit is an electrical device that supplies electric power to an electrical load. Indeed, power supply units typically have a power input connection, which receives energy in the form of electric current from a source, and one or more power output connections that deliver current to the load. The primary function of a power supply is to convert electric current from a source to a correct voltage, current, and frequency to power a load. Indeed, a power supply unit may perform a variety of functions, such as, but not limited to, power conversion, alternating current to direct current (AC-DC) or DC-DC conversion, adjusting voltage levels, and providing backup power during power grid outages. A power supply system typically includes multiple power sources (or power supply units) that provide power and power management functionality including load current sharing among the multiple power sources.

An increased demand for high-density packaging of power conversion has led to applications such as DC-DC modules and low-profile board-mount bricks whereby a given main transformer can have multiple primary windings coupled to multi-rail converters that are fed from different input sources. However, current imbalance circulating among the primary currents due to differences in input voltage and/or component value tolerances. can negatively impact the converter efficiency and can even cause the converter to fail.

FIGS. 1 and 2 illustrate an example multi-rail power converter and simulated graphs showing current imbalance in the primary currents. In FIG. 1, a power supply 100 has a pair of power converters 101, 102 having voltage inputs connected to different voltage source 103, 104. The power converters 101, 102 are coupled with respective primary windings of a transformer 105. Secondary windings of the transformer 105 transfer energy through a rectifier 106 for output voltage delivery to a load 107 via a voltage output 108. FIG. 2 shows a phase shift in the primary currents 200, 201 supplied by the power converters 101, 102 in response to a diversion of the input voltages 202, 203 provided by the voltage sources 103, 104. In addition to the imbalance in the input voltages, differences in component values such as resonant component values in the case of resonant converters further contribute to the imbalance in the primary currents, resulting in additional circulating current negatively affecting the converter efficiency.

One way to combat the current imbalance when the transformer primary windings are connected to two different input sources and are coupled together on the same core is to introduce sufficient leakage inductance in the main transformer 105 to reduce or eliminate the circulating current. However, higher leakage inductance generally reduces the performance of the transformer and increases its size. In resonant conversion applications, the additional leakage inductance becomes part of the resonant tank and, hence, cannot prevent the circulating current.

SUMMARY

In accordance with one aspect of the present disclosure, a power conversion apparatus comprises a main transformer having a first winding and a second winding wound about a main transformer core and coupled together via mutual inductance in response to a first current flowing through the first winding and a second current flowing through the second winding. The power conversion apparatus also comprises a first voltage converter coupled to a first input voltage source and configured to supply the first current to the first winding and comprises a second voltage converter coupled to a second input voltage source distinct from the first input voltage source. The second voltage converter is configured to supply the second current to the second winding simultaneously with the supply of the first current by the first voltage converter. The power conversion apparatus also comprises a secondary transformer has a first winding configured to generate a first magnetic flux in a first direction in response to the first current flowing therethrough and has a second winding configured to generate a second magnetic flux in a second direction opposite the first direction in response to the second current flowing therethrough. The first and second windings of the secondary transformer are coupled together via mutual inductance in response to the first and second currents flowing therethrough.

In accordance with another aspect of the present disclosure, a power supply comprises a main transformer having a core and first and second primary windings wound about the core and inductively coupled together, each of the first and second primary windings comprising a first terminal and a second terminal. The power supply also comprises first and second voltage converters, each comprising a voltage input configured to receive a distinct input voltage and a plurality of switches coupled between the voltage input and the main transformer. At least one switch of the plurality of switches of the first voltage converter is coupled with the first terminal of the first primary winding via a first current flow path, and at least one switch of the plurality of switches of the second voltage converter is coupled with the first terminal of the second primary winding via a second current flow path. The power supply also comprises a balance transformer comprising a core, a first winding wound about the core and serially coupled with the first current flow path, and a second winding wound about the core and inductively coupled with the first winding and serially coupled with the second current flow path. A first current flowing along the first current flow path during a positive voltage power delivery operation is configured to generate a first magnetic flux in a first direction through the core of the balance transformer, and a second current flowing along the second current flow path during the positive voltage power delivery operation is configured to generate a second magnetic flux in a second direction through the core of the balance transformer opposite the first direction.

BRIEF DESCRIPTION OF THE DRAWINGS

The drawings illustrate embodiments presently contemplated for carrying out the invention.

In the drawings.

Figure 1:
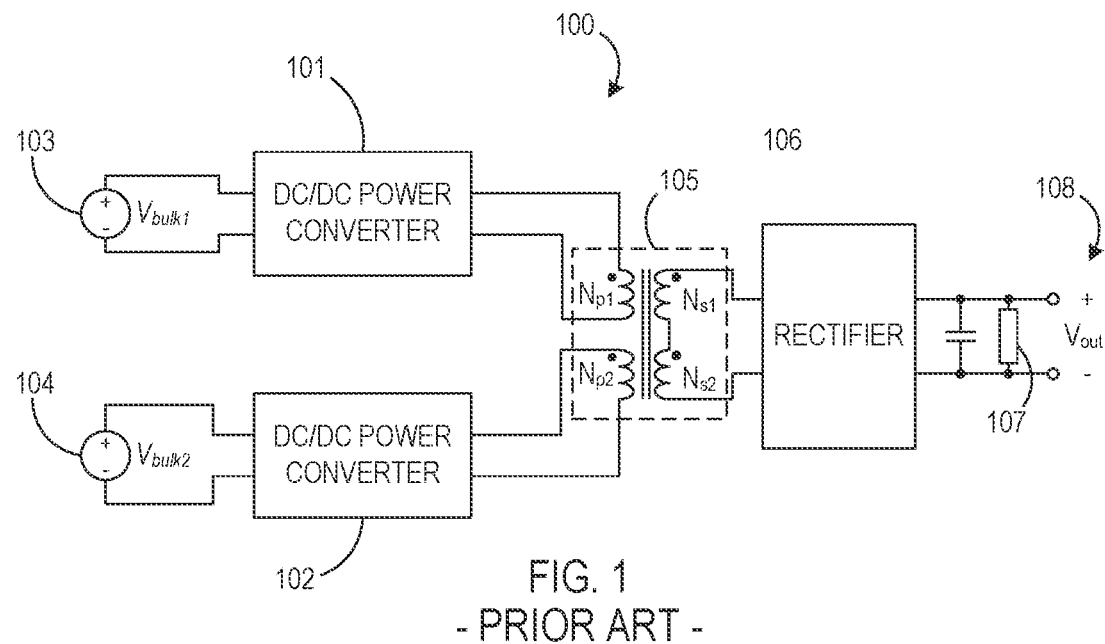
FIG. 1 is a schematic diagram of a known multi-rail power converter subject to current imbalance in an example.
Figure 2:
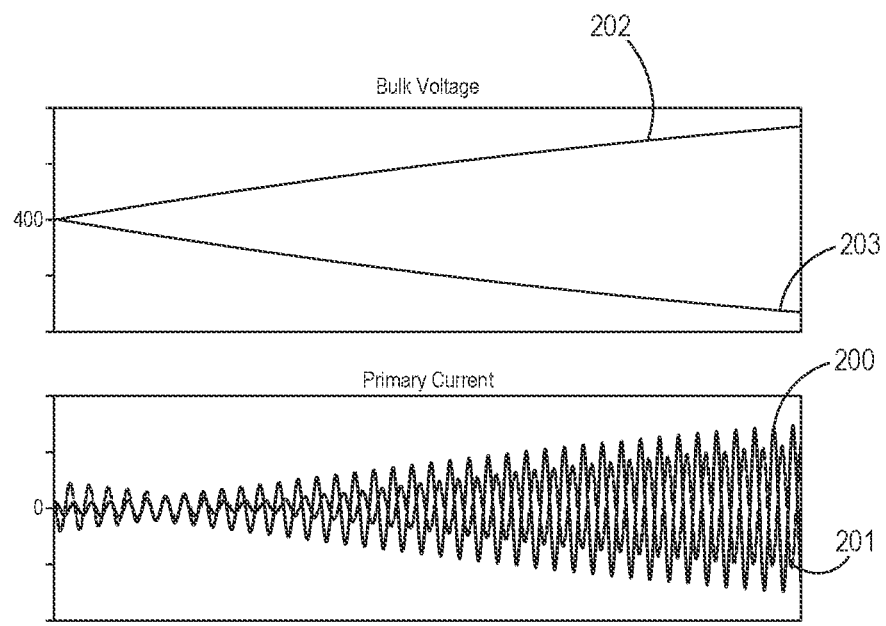
FIG. 2 illustrates simulated voltage and current curves illustrating effects of curent imbalance due to divergent input voltages to the power converters of FIG. 1 in an example.

While the present disclosure is susceptible to various modifications and alternative forms, specific embodiments thereof have been shown by way of example in the drawings and are herein described in detail. It should be understood, however, that the description herein of specific embodiments is not intended to limit the present disclosure to the particular forms disclosed, but on the contrary, the intention is to cover all modifications, equivalents, and alternatives falling within the spirit and scope of the present disclosure. Note that corresponding reference numerals indicate corresponding parts throughout the several views of the drawings.

DETAILED DESCRIPTION

Examples of the present disclosure will now be described more fully with reference to the accompanying drawings. The following description is merely exemplary in nature and is not intended to limit the present disclosure, application, or uses.

Example embodiments are provided so that this disclosure will be thorough and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

Although the disclosure hereof is detailed and exact to enable those skilled in the art to practice the invention, the physical embodiments herein disclosed merely exemplify the invention which may be embodied in other specific structures. While the preferred embodiment has been described, the details may be changed without departing from the invention, which is defined by the claims.

Figure 3:
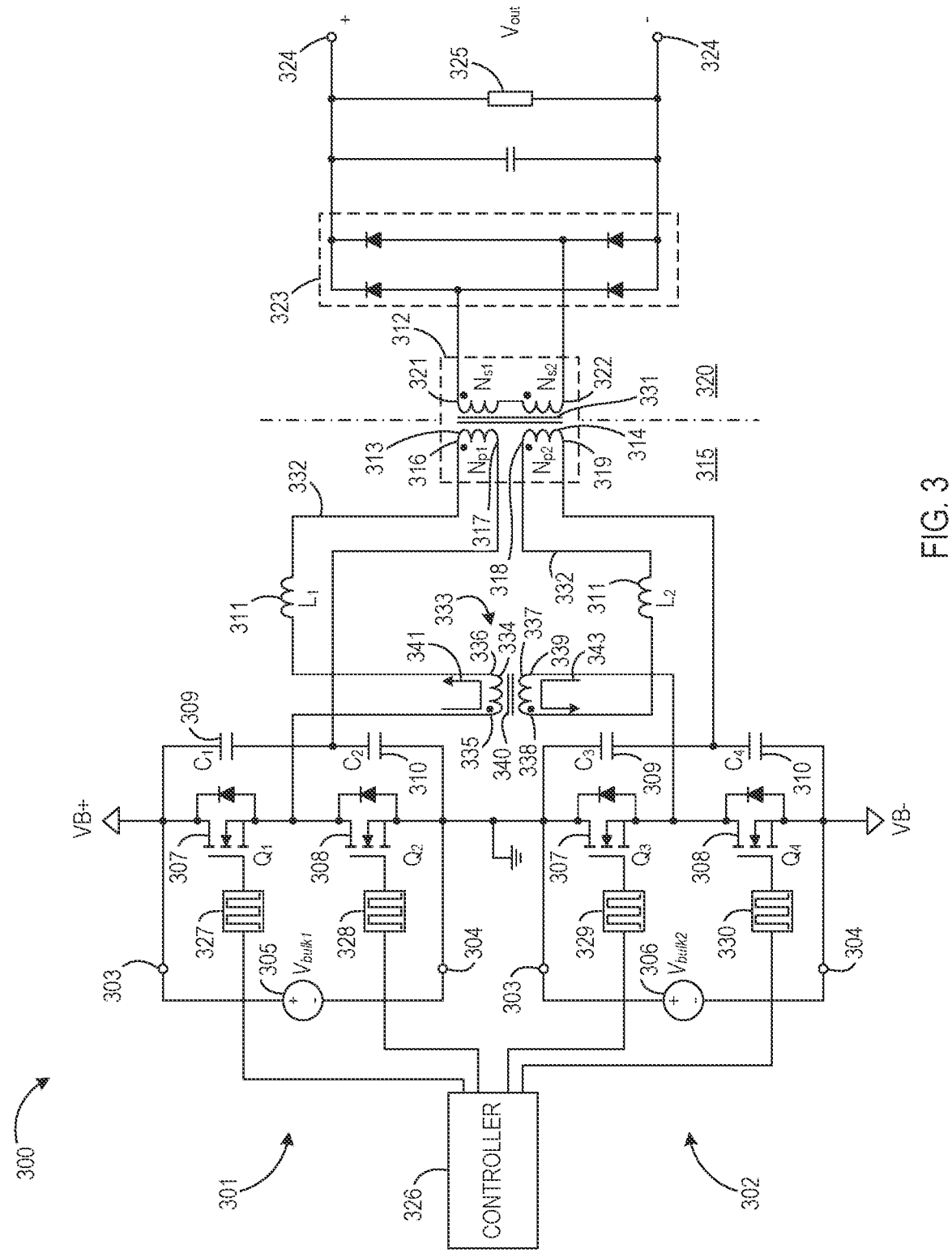
FIG. 3 illustrates a schematic diagram of a multi-rail power converter according to an embodiment.

FIG. 3 illustrates a schematic diagram of a multi-rail power converter 300 according to an embodiment. A pair of voltage converters 301, 302 are shown. Implementations of this disclosure, however, are not limited to two converters. Each voltage converter 301, 302 is shown implemented as a resonant half-bridge LLC series converter and has a voltage input formed from a pair of voltage input terminals 303, 304 that is coupleable with a voltage source 305, 306 providing respective input voltages $V_{bulk1}$, $V_{bulk2}$. As further described herein, embodiments of this disclosure are not limited to resonant half-bridge LLC series converters. That is, means for reducing current imbalance among the multiple power converters may benefit resonant converters, forward converters, buck-based converters, and the like. The LLC voltage converters 301, 302 include two power switches 307, 308 coupled to the respective voltage inputs, two capacitors 309, 310, and a resonant inductor 311.

A main transformer 312 includes a pair of primary windings 313, 314 on a primary side 315 thereof coupled to the voltage converters 301, 302. Specifically, a first terminal 316 at a dot end of the primary winding $N_{p1}$ (313) is coupled with the inductor $L_1$ (311), and a second terminal 317 is coupled with the capacitors $C_1$, $C_2$ (309, 310). Similarly, a first terminal 318 at a dot end of the primary winding $N_{p2}$ (314) is coupled with the inductor $L_2$ (311), and a second terminal 319 is coupled with the capacitors $C_3$, $C_4$ (309, 310). The respective capacitors 309-310, inductor 311, and a magnetizing inductance of the main transformer 312 from each primary winding 313, 314 form a resonant LLC tank for each voltage converter 301, 302. On a secondary side 320 of the main transformer 312, a pair of secondary windings 321, 322 is coupled to a rectifying circuit 323 to convert an AC-induced current on the secondary windings 321, 322 into a DC current for delivering an output voltage on a voltage output 324 to a load 325. The rectifying circuit 323 is shown as a full-wave rectifier including four diodes. In other configurations, the diodes may be replaced by synchronous rectifier switches.

A controller 326 is coupled to control the power switches 307, 308 of the voltage converters 301, 302 using pulse-width modulation (PWM) signals 327-330 in one implementation. The controller 326 may (or another controller) be also configured to drive any power switches in the rectifying circuit 323 if used through an isolation component such as an optocoupler, a transformer, or other isolation device. The controller 326 is configured to control the power switches 307, 308 in a synchronous manner such that power conversion in the voltage converter 301 is in phase with the power conversion in the voltage converter 302. For example, the PWM signals 327, 329 control the on and off states of the power switches 307 together, and the the PWM signals 328, 330 control the on and off states of the power switches 308 together.

Figure 4:
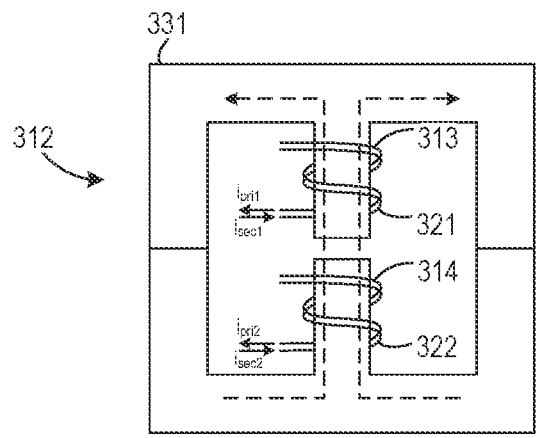
FIG. 4 illustrates a winding arrangement of the main transformer according to an embodiment.
Figure 5:
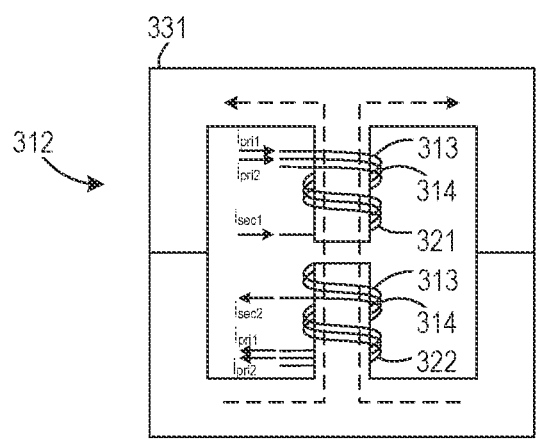
FIG. 5 illustrates a winding arrangement of the main transformer according to another embodiment.

The voltage converters 301, 302 may be coupled in a stacked arrangement or in a parallel arrangement. The use of a single main transformer 312 with both voltage converters 301, 302 allows space savings when a high-power, high-density power supply is desired. Since both converters 301, 302 supply current to the main transformer 312, winding the primary windings 313, 314 about a core 331 in a tightly-coupled arrangement can reduce leakage inductance between the windings 313, 314 as this leakage inductance contributes to conversion inefficiency such as when there is higher winding proximity loss. Referring to FIGS. 4 and 5, examples are shown of alternative winding protocols of the primary windings 313, 314 about the same limb of the core 331. In one embodiment, the primary windings 313, 314 are wound in a tightly-coupled arrangement to maximize their mutual inductance and to minimize leakage inductance created therebetween. However, other winding arrangements are also contemplated herein.

Referring back to FIG. 3, a current flow path 332 from the power switches 307, 308 and through the inductors 311 provides current toward the dot end of the primary windings 313, 314 during a positive voltage power delivery operation in which the switches 307 are controlled into their conducting states to allow current from the voltage sources 305, 306 to generate a positive voltage across the primary windings 313, 314. Since the voltage sources 305, 306 provide independent voltage to the respective voltage converters 301, 302, they may provide different voltages and currents to the voltage converters 301, 302, causing different primary currents to flow through the current flow paths 332. In a tightly-coupled arrangement as described above, such current imbalance results in current recirculation where current from one voltage converter transfers to the other. For example, if one of the voltage converters (e.g., voltage converter 301) produces a higher primary current than the other (e.g., voltage converter 302) a portion of the primary current of voltage converter 301 is transferred to the voltage converter 302 rather than to the secondary winding 321 as intended. Accordingly, converter efficiency is reduced.

To address and reduce or eliminate current imbalance among the primary currents a balance transformer 333 is introduced into the current flow paths 332 of the converters 301, 302. The balance transformer 333 includes a first winding 334 having a first terminal 335 at a dot end serially coupled with the switches $Q_1$, $Q_2$ (307, 308) and a second terminal 336 serially coupled with the inductor $L_1$ (311). A second winding 337 of the balance transformer 333 has a first terminal 338 at a dot end serially coupled with the inductor $L_2$ (311) while a second terminal 339 is serially coupled with the switches $Q_3$, $Q_4$ (307, 308). Thus, the first and second windings 334, 337 are serially coupled in the respective current flow paths 332 while they are simultaneously inductively coupled together in an anti-parallel arrangement. The first and second windings 334, 337 are wound around a balance transformer core 340 Referring to FIG. 6, an example is shown of a winding protocol of the first and second windings 334, 337 of the balance transformer 333. However, other winding arrangements are also contemplated herein.

Figure 6:
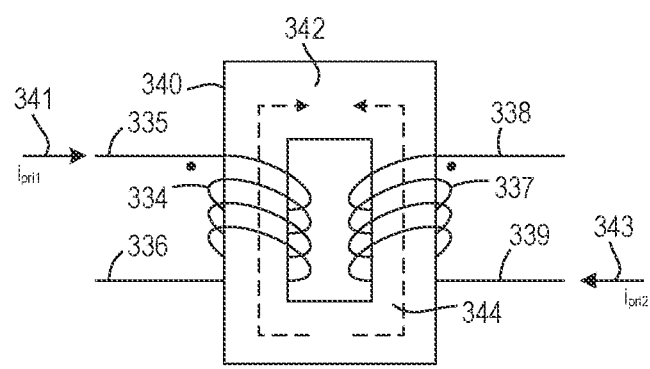
FIG. 6 illustrates a winding arrangement of the balance transformer according to an embodiment.

As illustrated in FIGS. 3 and 6, a primary current 341 generated in the voltage converter 301 in response to the positive voltage power delivery operation flows along the current flow path 332 toward the first terminal 335 of the first winding 334, creating a magnetic flux 342 in a first direction through the core 340. A primary current 343 generated in the voltage converter 302 in response to the positive voltage power delivery operation flows along the current flow path 332 toward the second terminal 339 of the second winding 337, creating a magnetic flux 344 in a second direction through the core 340 opposite the first direction. Due, at least in part, to the mutual inductance formed between the first and second windings 334, 337, the opposing magnetic fluxes reduce current imbalance between the current flow paths 332. Similar to the primary windings 313, 314 of the main transformer 312, the first and second windings 334, 337 of the balance transformer 333 may be tightly wound about the core 340 to maximize their mutual inductance. However, as described below (e.g., FIG. 11), loosening the windings to increase leakage inductance may be beneficial.

Figure 7:
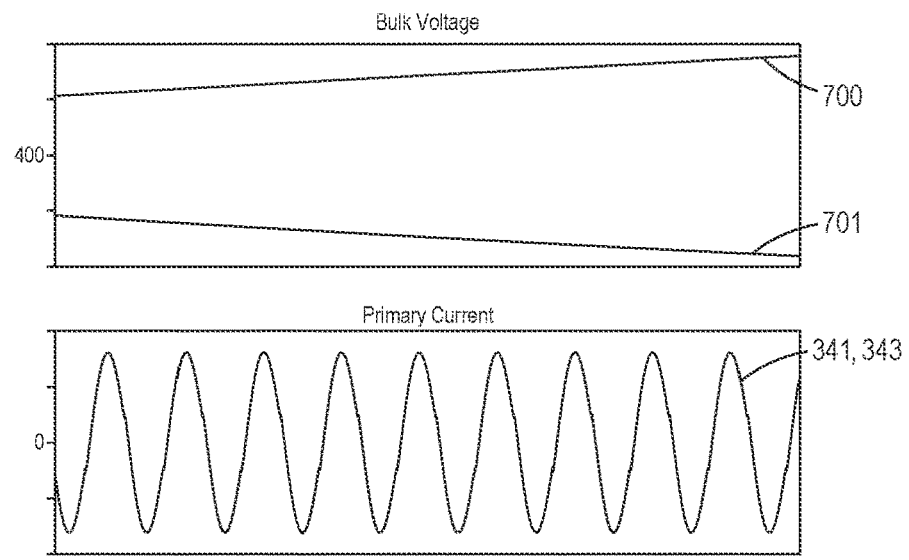
FIG. 7 illustrates simulated voltage and current curves illustrating effects of curent balancing due to divergent input voltages to the power converters of FIG. 3 in an example.

FIG. 7 illustrates simulated voltage and current curves showing the effects of curent balancing due to divergent input voltages based on implementing the technique of FIG. 3 in an example. As shown, a diversion of the input voltages 700, 701 provided by the voltage sources reduces phase shift among the primary currents 341, 343.

Figure 8:
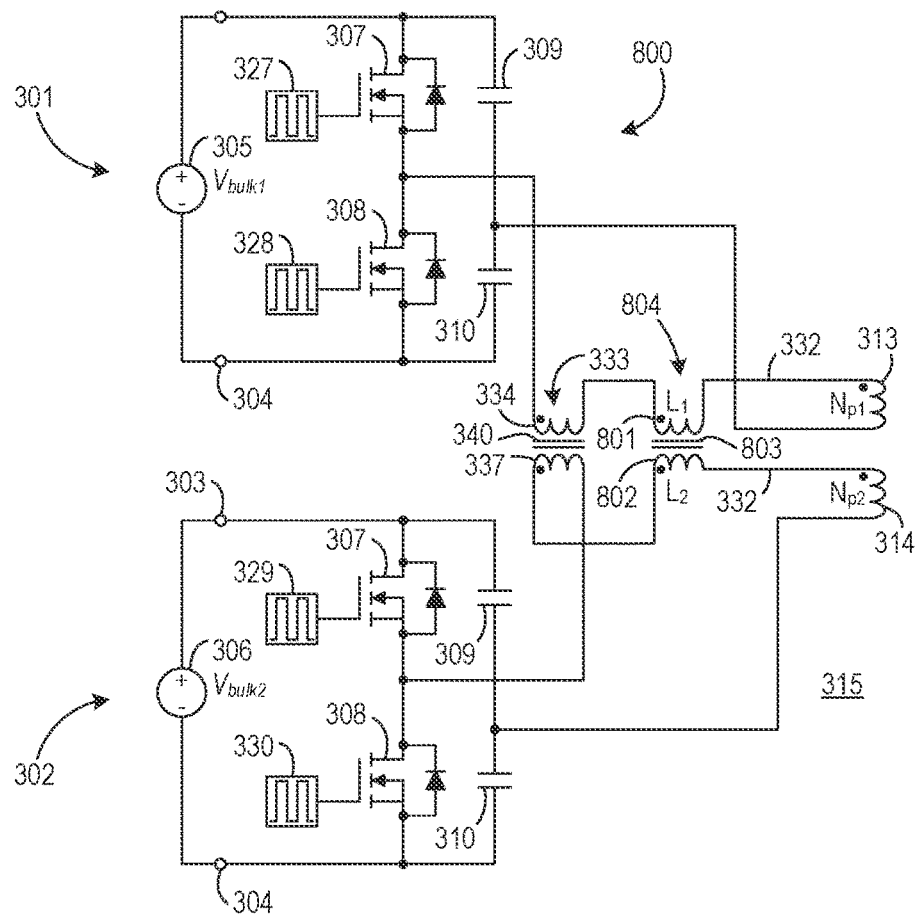
FIG. 8 illustrates a schematic diagram of a portion of the multi-rail power converter of FIG. 3 according to another embodiment.
Figure 9:
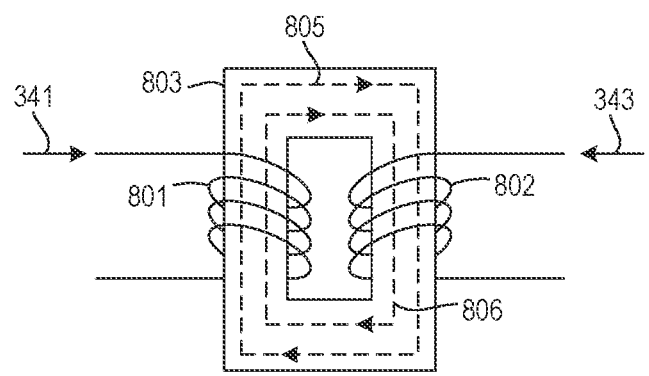
FIG. 9 illustrates a winding arrangement of a resonant transformer according to an embodiment.
Figure 10:
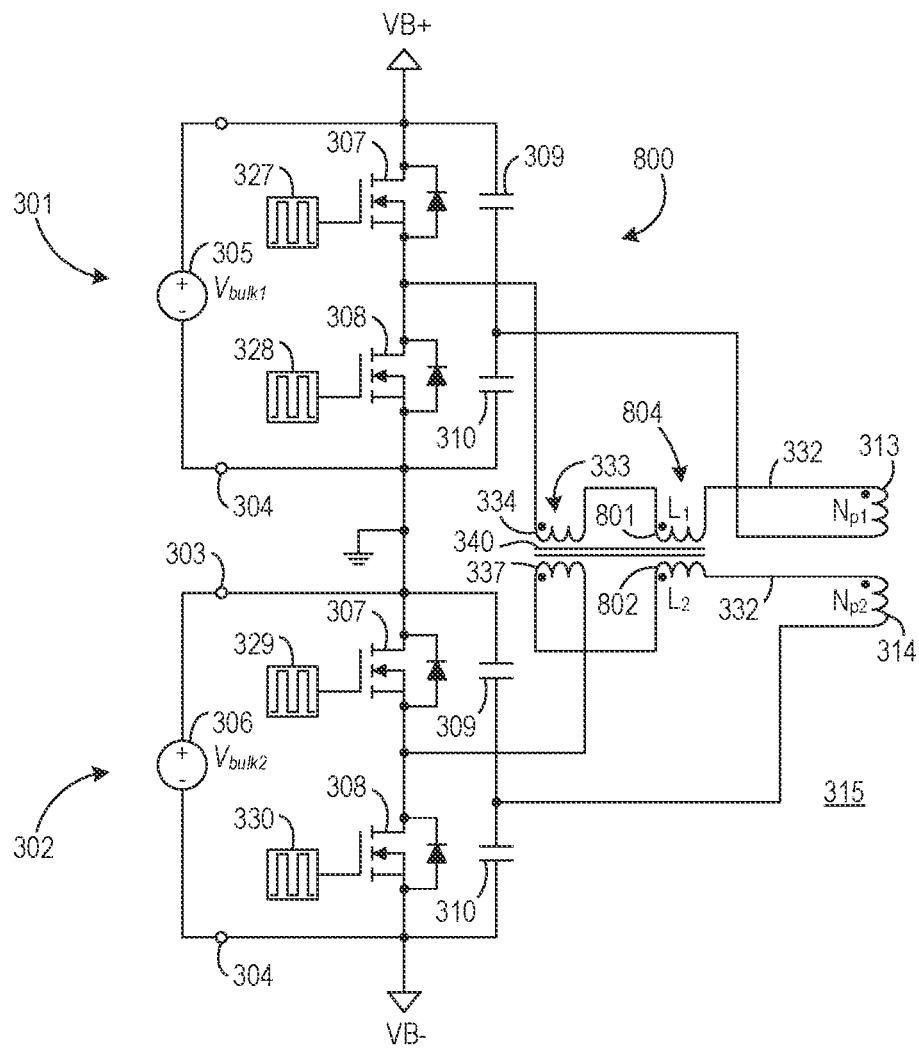
FIG. 10 illustrates a schematic diagram of a portion of the multi-rail power converter of FIG. 3 according to another embodiment.

FIG. 8 illustrates a portion 800 of the multi-rail power converter 300 of FIG. 3 according to another embodiment. Components in FIG. 8 similar to those of the multi-rail power converter 300 are discussed above. In an embodiment alternative to that shown in FIG. 3, the inductors $L_1$, $L_2$ of the voltage converters 301, 302 are first and second windings 801, 802 wound about a core 803 of a forward-coupled resonant transformer 804. In addition, the voltage converters 301, 302 are shown in a parallel arrangement with each being coupled to the respective voltage source 305, 306 without a common ground connection as the stacked arrangement shown in FIG. 3. In another embodiment, voltage sources 305, 306 may be provided from a common source, Vbulk. However, due to differences in component tolerances such as in, for example, the resonant capacitors 309, 310 or other components, an imbalance in the primary currents flowing through the current flow paths 332 may be addressed via the embodiments described herein. As illustrated in FIG. 9, flow of the primary currents 341, 343 through the first and second windings 801, 802 generates additive magnetic fluxes 805, 806. As illustrated in FIG. 10, rather than being formed into a separate transformer, the resonant inductors $L_1$, $L_2$ of the voltage converters 301, 302 may be wound on the core 340 of the balance transformer 333 in a forward-coupled arrangement.

Figure 11:
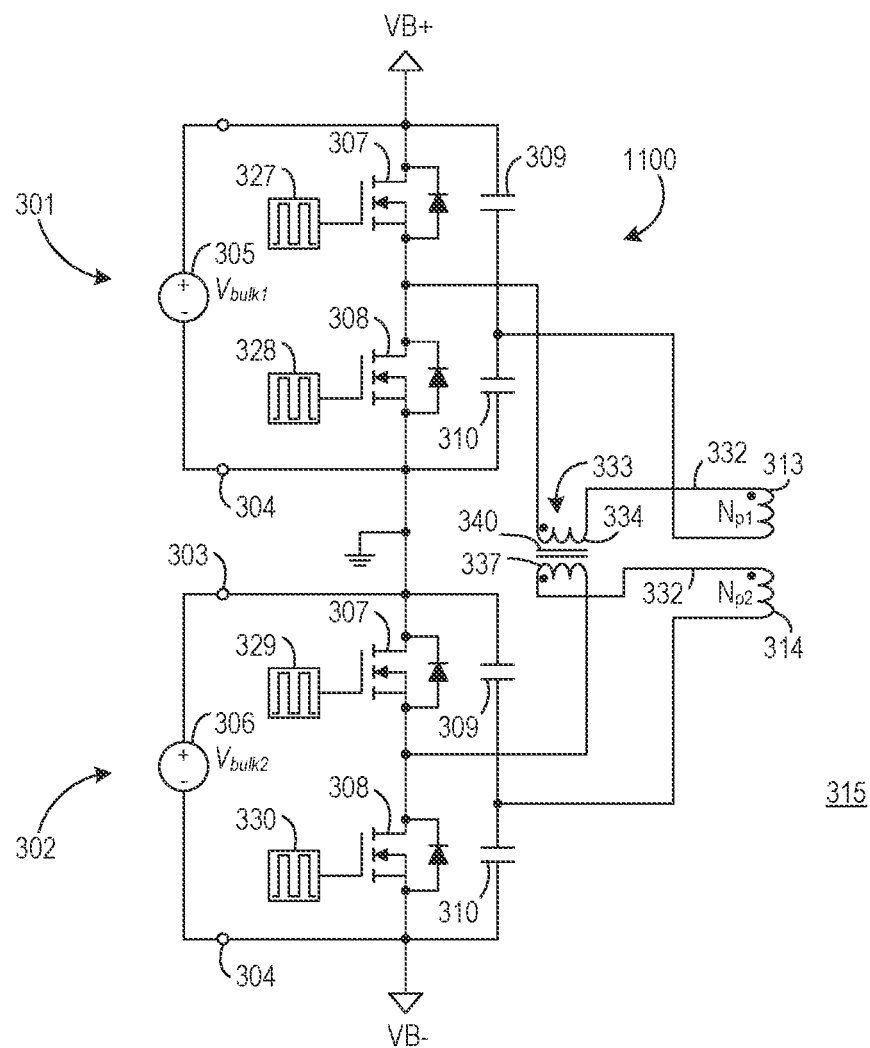
FIG. 11 illustrates a schematic diagram of a portion of the multi-rail power converter of FIG. 3 according to another embodiment.

As stated above, it may be beneficial to design a leakage inductance into the operation of the balance transformer 333. FIG. 11 illustrates a portion 1100 of the multi-rail power converter 300 of FIG. 3 according to another embodiment. In FIG. 11, first and second windings 334, 337 of the balance transformer 333 are wound about the core 340 in a loosely-coupled arrangement to create a leakage inductance capable of providing the resonant inductance for each of the voltage converters 301, 302. Based on the following equations, known or measurable parameters of the balance transformer 333 may be used to determine the values for unknown parameters.

$$L_r = L_{self} - L_{mutual} \tag{Eqn. 1}$$

$$L_{mutual} = k \cdot L_{self} \tag{Eqn. 2}$$

$$k = \sqrt{1 - \frac{L_{lk}}{L_{self}}} \tag{Eqn. 3}$$

For example, knowing the desired resonant inductance ($L_r$) and self-inductance ($L_{self}$), the mutual inductance ($L_{mutual}$) can be calculated. With a known coupling coefficient (k), the leakage inductance ($L_{lk}$) can be determined. The values for the mutual inductance and the leakage inductance can then be used to choose the transformer component satisfying circuit design parameters. Accordingly, the balancing transformer can be designed with sufficient leakage inductance to obtain the desired Lr for resonant converter applications requiring such. For applications not requiring such functionality, the balancing transformer may be designed to minimize the leakage component.

Figure 12:
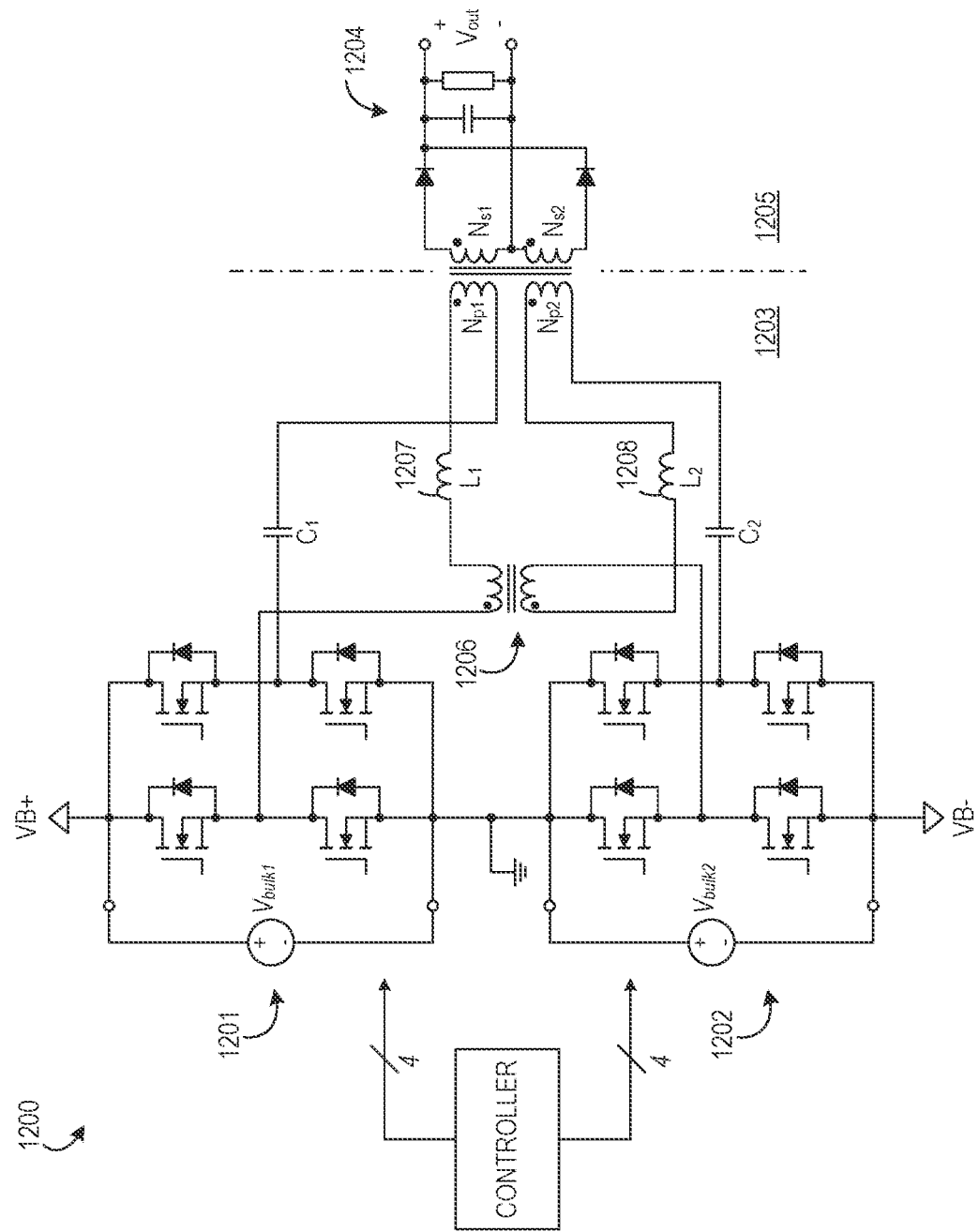
FIG. 12 illustrates a schematic diagram of a multi-rail power converter according to another embodiment.

FIG. 12 illustrates an example of an LLC multi-rail power converter 1200 according to another embodiment. The power converters 1201, 1202 in FIG. 12 are illustrated as full-bridge LLC converters on the primary side 1203 with a full wave rectifier 1204 on the secondary side 1205. The balance transformer 1206 and the inductors 1207, 1208 are shown coupled together as described above with respect to FIG. 3 and operate as described above. However, the other embodiments for the balance transformer 1206 and the inductors 1207, 1208 discussed herein (e.g., FIGS. 8, 10, 11) are implementable as alternate embodiments in the multi-rail power converter 1200. While FIGS. 3 and 12 illustrate half- and full-bridge implementations of an LLC converter and other forward- and Buck-derived topologies.

Figure 13:
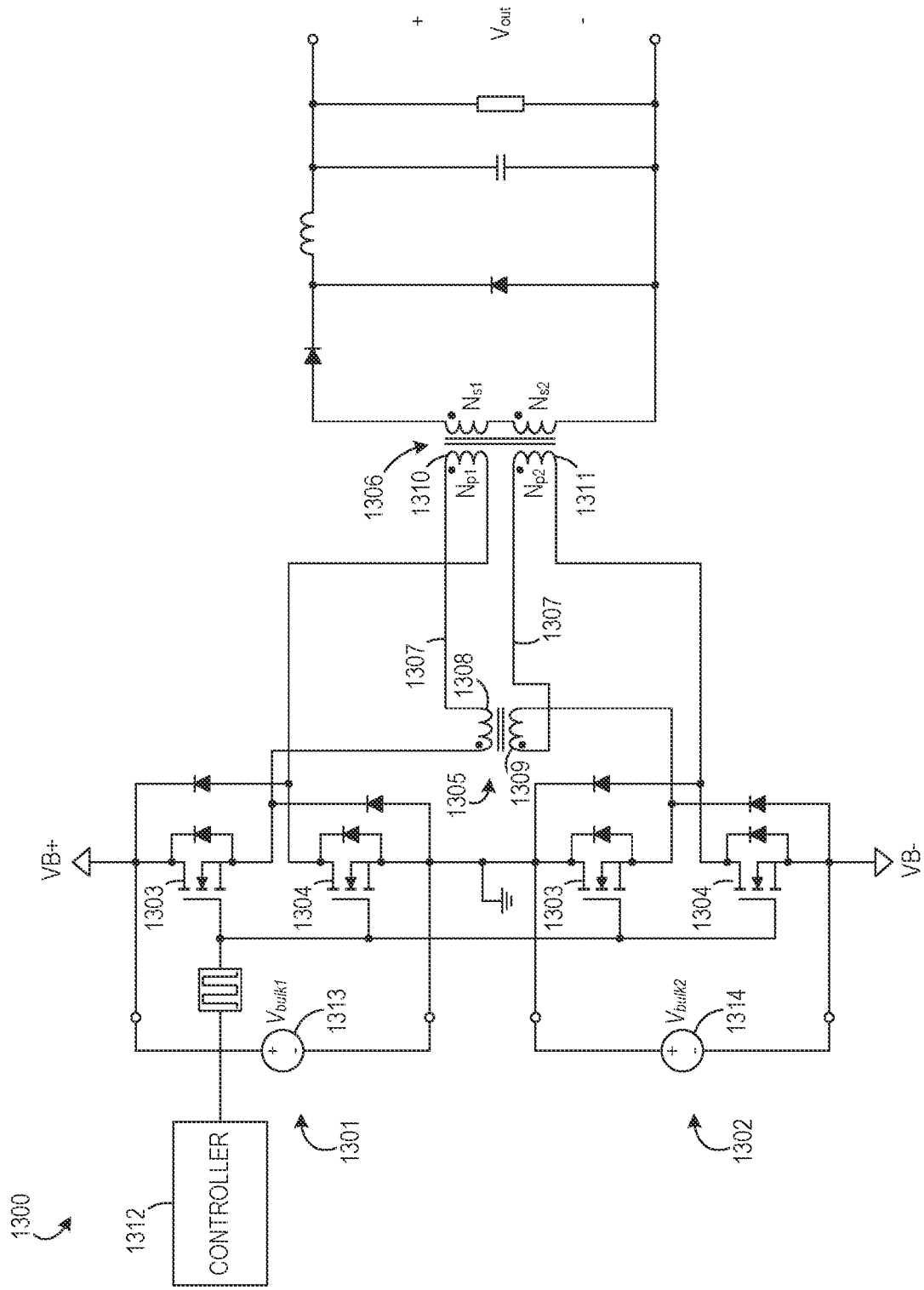
FIG. 13 illustrates a schematic diagram of a multi-rail power converter according to another embodiment.

FIG. 13 illustrates a multi-rail power converter 1300 according to another embodiment. The multi-rail power converter 1300 includes a pair of power converters 1301, 1302 arranged in a stacked forward converter topology or arrangement. Each power converter 1301, 1302 includes a pair of power switches 1303, 1304. The power switch 1303 is coupled to a balance transformer 1305 coupled to a main transformer 1306 in a similar manner as described above. A current flow path 1307 from the power switch 1303 and through the balance transformer windings 1308, 1309 provides current toward the dot end of the primary windings primary winding 1310, 1311 during a positive voltage power delivery operation in which the switches 1303, 1304 are controlled into their conducting states by a controller 1312 to allow current from the voltage sources 1313, 1314 to generate a positive voltage across the primary windings 1310, 1311. Due, at least in part, to the mutual inductance formed between the balance transformer windings 1308, 1309, current imbalance caused, for example, by different voltages provided by the voltage source 1313, 1314 and/or different component values within the circuit of the multi-rail power converter 1300 is reduced between the current flow paths 1307.

Figure 14:
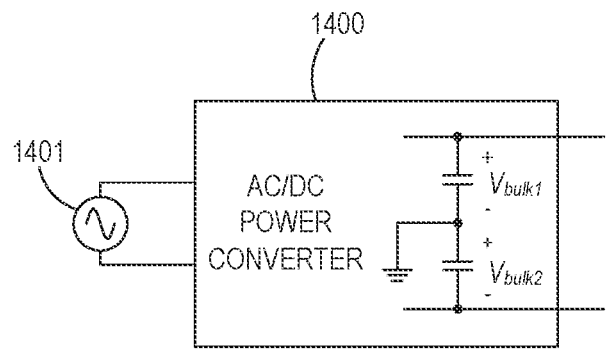
FIG. 14 illustrates a power supply according to an embodiment.
Figure 15:
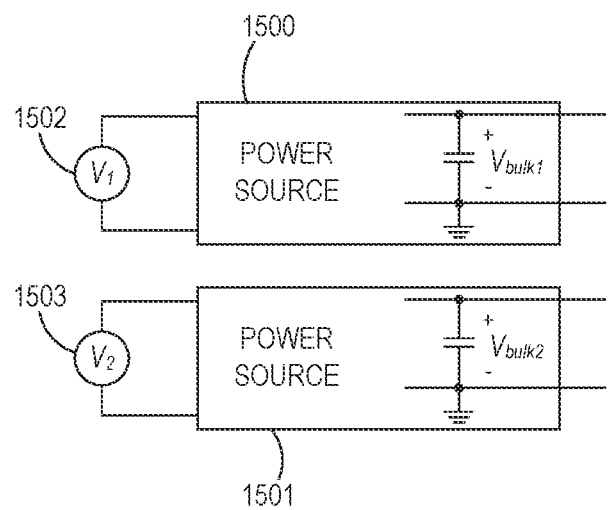
FIG. 15 illustrates multiple power supplies according to an embodiment.

FIG. 14 illustrates a voltage supply 1400 for providing different and distinct voltages for the voltage inputs of the multi-rail power converters described herein. For example, the voltage supply 1400 may provide the input voltages $V_{bulk1}$, $V_{bulk2}$ illustrated in FIGS. 3, 8, and 10-13. The voltage supply 1400 is an AC/DC power converter configured to convert an AC input voltage from an AC voltage source 1401 (e.g., the power grid) into the multiple input voltages $V_{bulk1}$, $V_{bulk2}$. FIG. 15 illustrates multiple voltage source 1500, 1501 for providing different and distinct voltages for the voltage inputs of the multi-rail power converters described herein. The voltage source 1500 is coupled to a first voltage source 1502, and the voltage supply 1501 is coupled to a second voltage source 1503. The first and second voltage sources 1502, 1503 are distinct sources and may be AC or DC sources. Based on the disclosed embodiments herein, differences or imbalances in the primary currents of the multi-rail power converters due to disparate voltage provided by the voltage supplies 1400, 1500, 1501 may be significantly reduced and/or eliminated.

According to embodiments, adding a reverse-coupled (flux cancelling) balancing transformer in series with the main transformer primary windings forces current sharing among the rails. The balancing transformer can be small and can also be designed to have a loose coupling such that the leakage participates in the resonance of resonant-based converters.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the present disclosure. Additionally, while various embodiments of the present disclosure have been described, it is to be understood that aspects of the present disclosure may include only some of the described embodiments. Accordingly, the invention is not to be seen as limited by the foregoing description but is only limited by the scope of the appended claims.

The invention claimed is:

1. A power conversion apparatus comprising:
   a main transformer comprising a first winding and a second winding wound about a main transformer core and coupled together via mutual inductance in response to a first current flowing through the first winding and a second current flowing through the second winding;
   a first voltage converter coupled to a first input voltage source and configured to supply the first current to the first winding;
   a second voltage converter coupled to a second input voltage source distinct from the first input voltage source, the second voltage converter configured to supply the second current to the second winding simultaneously with the supply of the first current by the first voltage converter;
   a secondary transformer comprising:
      a first winding configured to generate a first magnetic flux in a first direction in response to the first current flowing therethrough;
      a second winding configured to generate a second magnetic flux in a second direction opposite the first direction in response to the second current flowing therethrough;
      wherein the first and second windings of the secondary transformer are coupled together via mutual inductance in response to the first and second currents flowing therethrough.

2. The power conversion apparatus of claim 1, wherein:
   the first voltage converter comprises a plurality of switches;
   the second voltage converter comprises a plurality of switches; and
   the power conversion apparatus further comprises a controller configured to:
      control the plurality of switches of the first voltage converter to generate the first current based on the first input voltage source; and
      control the plurality of switches of the second voltage converter to generate the second current based on the second input voltage source.

3. The power conversion apparatus of claim 2, wherein the first and second voltage converters comprise LLC converters.

4. The power conversion apparatus of claim 3, wherein:
   the first voltage converter comprises a resonant tank comprising a resonant inductor coupled to the plurality of switches of the first voltage converter and to the first winding; and
   the second voltage converter comprises a resonant tank comprising a resonant inductor coupled to the plurality of switches of the second voltage converter and to the second winding.

5. The power conversion apparatus of claim 4, wherein:
   the resonant inductor of the first voltage converter comprises a first winding wound about a resonant inductor core; and
   the resonant inductor of the second voltage converter comprises a second winding wound about the resonant inductor core.

6. The power conversion apparatus of claim 4, wherein:
the secondary transformer further comprises a secondary transformer core; and
the first and second windings of the secondary transformer are wound about the secondary transformer core.

7. The power conversion apparatus of claim 6, wherein:
the resonant inductor of the first voltage converter comprises a first winding wound about the secondary transformer core; and
the resonant inductor of the second voltage converter comprises a second winding wound about the secondary transformer core.

8. The power conversion apparatus of claim 3, wherein:
the first voltage converter comprises a resonant tank;
the second voltage converter comprises a resonant tank; and
a leakage inductance formed via a coupling of the first and second windings of the secondary transformer creates a resonant inductance for the resonant tanks of the first and second voltage converters.

9. The power conversion apparatus of claim 1, wherein the secondary transformer is configured to reduce circulating current among the first and second voltage converters.

10. A power supply comprising:
a main transformer comprising a core and first and second primary windings wound about the core and inductively coupled together, each of the first and second primary windings comprising a first terminal and a second terminal;
first and second voltage converters, each comprising:
a voltage input configured to receive a distinct input voltage;
a plurality of switches coupled between the voltage input and the main transformer;
wherein at least one switch of the plurality of switches of the first voltage converter is coupled with the first terminal of the first primary winding via a first current flow path; and
wherein at least one switch of the plurality of switches of the second voltage converter is coupled with the first terminal of the second primary winding via a second current flow path;
a balance transformer comprising:
a core;
a first winding wound about the core and serially coupled with the first current flow path; and
a second winding wound about the core and inductively coupled with the first winding and serially coupled with the second current flow path;
wherein a first current flowing along the first current flow path during a positive voltage power delivery operation is configured to generate a first magnetic flux in a first direction through the core of the balance transformer; and
wherein a second current flowing along the second current flow path during the positive voltage power delivery operation is configured to generate a second magnetic flux in a second direction through the core of the balance transformer opposite the first direction.

11. The power supply of claim 10, wherein the first and second voltage converters comprise one of an LLC converter topology and a forward converter topology.

12. The power supply of claim 10, wherein the first and second voltage converters are arranged in a stacked arrangement.

13. The power supply of claim 10, wherein:
the first voltage converter comprises a resonant inductor serially coupled with the first current flow path and a resonant capacitor coupled with the first current flow path; and
the second voltage converter comprises a resonant inductor serially coupled with the second current flow path and a resonant capacitor coupled with the second current flow path.

14. The power supply of claim 13 further comprising a resonant transformer comprising a core;
wherein the resonant inductors of the first and second voltage converters are wound about the core of the resonant transformer.

15. The power supply of claim 13, wherein the resonant inductors of the first and second voltage converters are wound about the core of the balance transformer.

16. The power supply of claim 10, wherein:
the first voltage converter comprises a resonant capacitor coupled with the first current flow path;
the second voltage converter comprises a resonant capacitor coupled with the second current flow path; and
the first and second windings of the balance transformer are wound about the core sufficiently to generate a leakage inductance configured to create a resonant tank with each of the resonant capacitors, of the first and second converters.

17. The power supply of claim 10 further comprising a controller coupled to the plurality of switches of the first voltage converter and to the plurality of switches of the second voltage converter, the controller configured to control power conversion within the first voltage converter in phase with power conversion within the second voltage converter.

18. The power supply of claim 17, wherein, during the positive voltage power delivery operation, the controller is configured to:
control the at least one switch of the plurality of switches of the first voltage converter into a conduction mode to cause the first current to flow through the first primary winding from the first terminal of the first primary winding to the second primary winding of the first primary winding; and
control the at least one switch of the plurality of switches of the second voltage converter into a conduction mode to cause the second current to flow through the second primary winding from the first terminal of the second primary winding to the second primary winding of the second primary winding.

19. The power supply of claim 10, wherein the main transformer further comprises:
a first secondary winding inductively coupled with the first primary winding;
a second secondary winding inductively coupled with the second primary winding;
a voltage rectifier coupled with the first and second secondary windings; and
a voltage output configured to deliver an output voltage to a load.

20. The power supply of claim 10, wherein the first and second primary windings are wound in a tightly-coupled arrangement.

* * * * *